US009481335B2

(12) United States Patent
Foo et al.

(10) Patent No.: US 9,481,335 B2
(45) Date of Patent: Nov. 1, 2016

(54) METHOD AND APPARATUS FOR DETECTING PEDESTRIAN VEHICLE IMPACT

(71) Applicant: TRW Automotive U.S. LLC, Livonia, MI (US)

(72) Inventors: Chek-Peng Foo, Ann Arbor, MI (US); Huahn-Fern Yeh, Novi, MI (US); Meng-Fu Tsai, Ann Arbor, MI (US); Raymond J. David, Dearborn Heights, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 14/264,822

(22) Filed: Apr. 29, 2014

(65) Prior Publication Data

US 2014/0236429 A1    Aug. 21, 2014

Related U.S. Application Data

(62) Division of application No. 12/778,505, filed on May 12, 2010, now Pat. No. 8,751,113.

(51) Int. Cl.
*B60R 21/0136* (2006.01)
*B60R 21/34* (2011.01)
*B60R 21/0132* (2006.01)
*B60R 21/013* (2006.01)

(52) U.S. Cl.
CPC ......... *B60R 21/0136* (2013.01); *B60R 21/013* (2013.01); *B60R 21/0132* (2013.01); *B60R 21/34* (2013.01)

(58) Field of Classification Search
USPC .......................................... 701/45
See application file for complete search history.

(56) References Cited

U.S. PATENT DOCUMENTS

| 5,668,723 | A | * | 9/1997 | Blackburn | 701/45 |
| 5,702,124 | A | * | 12/1997 | Foo et al. | 280/735 |
| 6,095,554 | A | * | 8/2000 | Foo et al. | 280/735 |
| 6,549,836 | B1 | * | 4/2003 | Yeh et al. | 701/45 |
| 8,348,004 | B2 | * | 1/2013 | Mack | 180/274 |
| 2004/0002815 | A1 | | 1/2004 | Ishizaki et al. | |

(Continued)

FOREIGN PATENT DOCUMENTS

| CN | 1468761 A | 1/2004 |
| CN | 1816470 A | 8/2006 |

(Continued)

*Primary Examiner* — Shelley Chen
(74) *Attorney, Agent, or Firm* — Tarolli, Sundheim, Covell & Tummino LLP

(57) ABSTRACT

An apparatus (50) detects a pedestrian/vehicle impact, the apparatus including a plurality of sensors (62, 64, 66) mounted near a forward location of a vehicle (52), each sensor providing an associated signal indicative of an impact event. A metric determining device (80) determines metric values for each of the sensor signals. A controller (80) determines if any of said determined metric values indicates the occurrence of a misuse event. The controller also determines if a pedestrian/vehicle impact event is occurring by comparing the metric value of at least one sensor signal against a selectable threshold. An actuation signal is provided in response to the comparison. The selectable threshold is selected in response to the determined occurrence of a misuse event. An actuatable pedestrian impact mitigation device (84) is attached to the vehicle and is actuated in responsive to the actuation signal from said controller.

13 Claims, 18 Drawing Sheets

(56) References Cited

U.S. PATENT DOCUMENTS

| | | | |
|---|---|---|---|
| 2004/0222667 A1* | 11/2004 | Ericsson | 296/187.03 |
| 2005/0006886 A1* | 1/2005 | Foo et al. | 280/735 |
| 2007/0005207 A1* | 1/2007 | Foo et al. | 701/45 |
| 2007/0045026 A1 | 3/2007 | Theisen | |
| 2007/0132565 A1* | 6/2007 | Tanabe | 340/436 |
| 2009/0205896 A1* | 8/2009 | Mack | 180/274 |
| 2010/0057302 A1* | 3/2010 | Foo et al. | 701/45 |

FOREIGN PATENT DOCUMENTS

| | | |
|---|---|---|
| DE | 19718803 | 10/1998 |
| DE | 10113720 | 9/2002 |
| DE | 10256950 | 6/2004 |
| DE | 10256952 | 6/2004 |
| DE | 102005006401 | 8/2006 |
| DE | 102006058863 | 7/2007 |
| JP | 2004-196239 A | 7/2004 |
| JP | 2008-542087 T | 11/2008 |
| JP | 2009-274698 A | 11/2009 |
| JP | 2010-504239 T | 2/2010 |
| KR | 1020080109945 A | 12/2008 |

* cited by examiner

METHOD AND APPARATUS FOR DETECTING PEDESTRIAN VEHICLE IMPACT

CROSS REFERENCE TO RELATED APPLICATION

The present application is a divisional patent application of U.S. patent application Ser. No. 12/778,505 filed May 12, 2010, the contents of which are hereby incorporated herein by reference.

TECHNICAL FIELD

The present invention relates to a protection system and, more particularly, to a method and apparatus for detecting a pedestrian vehicle impact.

BACKGROUND OF THE INVENTION

Vehicle occupant protection devices for helping to protect a vehicle occupant during a vehicle event such as a crash, roll-over, etc., are known. To detect such a vehicle event, one or more event sensors are mounted to the vehicle and provide signals indicative of vehicle event conditions for which actuation of the protection device may be desired. The event sensors are connected to a controller that evaluates the event sensor signals using appropriate metrics. Upon determining the occurrence of a particular type of vehicle event, the vehicle occupant protection devices, e.g., air bags, inflatable side curtains, etc., are actuated.

Pedestrian protection systems have been proposed to reduce pedestrian injury when struck by a moving vehicle. Some proposed pedestrian protection systems include a sensor mounted in the vehicle bumper. If the sensor detects an impact with a pedestrian, an actuatable device is actuated to mitigate the impact effect. Such actuatable devices include, for example, actuators to raise the trailing end of the hood upward so as to aid in absorbing the impact effect. Actuatable forward mounted air bags have also been proposed to reduce impact effects.

SUMMARY OF THE INVENTION

In accordance with the present invention, a method and apparatus are provided for determining a vehicle/pedestrian impact using forward mounted accelerometers and analyzing signals from the accelerometers in terms of impact energy.

In accordance with one example embodiment of the present invention, an apparatus detects a pedestrian/vehicle impact comprising a plurality of sensors mounted near a forward location of a vehicle, each sensor providing an associated signal indicative of an impact event. A metric determining device determines displacement and impact energy metric values for each of the sensor signals and a controller determines if a pedestrian impact has occurred in response to the determined metric values and provides an actuation control signal in response thereto. An actuatable impact mitigation device is attached to the vehicle and is responsive to the actuation control signal.

In accordance with one example embodiment of the present invention, an apparatus detects a pedestrian/vehicle impact, the apparatus including a plurality of sensors mounted near a forward location of a vehicle, each sensor providing an associated signal indicative of an impact event. A metric determining device determines metric values for each of the sensor signals. A controller determines if any of said determined metric values indicates the occurrence of a misuse event. The controller also determines if a pedestrian/vehicle impact event is occurring by comparing the metric value of at least one sensor signal against a selectable threshold. An actuation signal is provided in response to the comparison. The selectable threshold is selected in response to the determined occurrence of a misuse event. An actuatable impact mitigation device is attached to the vehicle and is actuated in responsive to the actuation signal from said controller.

In accordance with another example embodiment of the present invention, a method is provided for detecting a pedestrian/vehicle impact comprising the steps of sensing impacts near a forward location of a vehicle and providing an associated signal indicative of an impact event, determining displacement and impact energy metric values for each of the sensor signals, determining if a pedestrian impact has occurred in response to the determined metric values and providing an actuation signal in response thereto, and actuating an actuatable impact mitigation device in response to said actuation signal.

In accordance with another example embodiment of the present invention, a method is provided for detecting a pedestrian/vehicle impact comprising the steps of sensing impact acceleration at a a plurality of locations near the front of the vehicle, determining metric values for each of the sensed accelerations, and determining if any of the metric values indicates the occurrence of a misuse event. The method further includes the steps of selecting a threshold in response to the determination of the occurrence of a misuse event, comparing the metric value of at least one sensed acceleration against the selectable threshold, and providing an actuation signal to an impact mitigation device in response to said comparison.

BRIEF DESCRIPTION OF THE DRAWINGS

The foregoing and other features and advantages of the invention will become apparent to one skilled in the art upon consideration of the following description of an exemplary embodiment of the invention and the accompanying drawings, in which:

FIGS. 4-13 are block diagrams showing portions of the discrimination control logic followed by the electronic control unit of FIG. 1A during different type of impact events in accordance with an exemplary embodiment of the present invention;

DESCRIPTION OF EMBODIMENTS

Figure 1A:
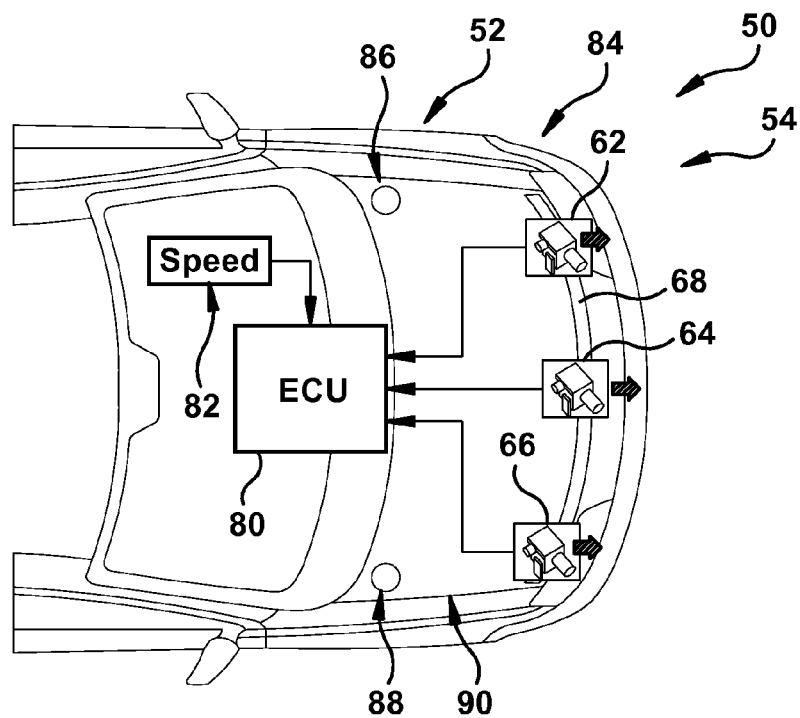
FIGS. 1A and 1B illustrate a pedestrian impact detection device in accordance with an exemplary embodiment of the present invention showing two different mounting arrangements for sensors.
Figure 1B:
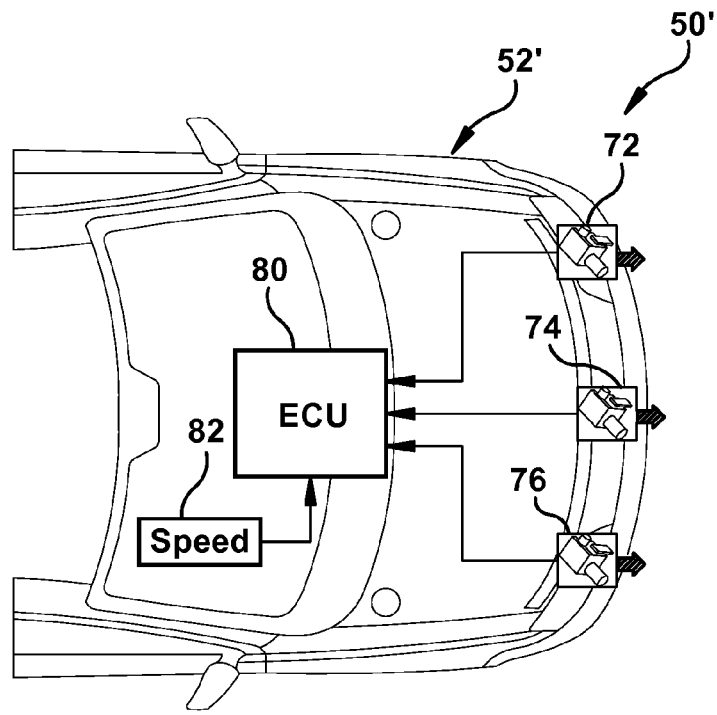

Referring to FIGS. 1A and 1B, a detection apparatus 50 is provided for detecting a pedestrian/vehicle impact. The detection apparatus 50 is mounted in a vehicle 52 and includes a plurality of sensors 54 mounted near a forward location of the vehicle. In accordance with one example embodiment of the present invention shown specifically in FIG. 1A, a plurality of sensors 62, 64, and 66 are mounted to a forward cross-member 68 of the vehicle 52 so as to be positioned at the left front location, center front location, and right front location, respectively, of the vehicle 52. In accordance with another example embodiment of the present invention, shown in FIG. 1B, a plurality of sensors 72, 74, and 76 are mounted to a front bumper 78 of the vehicle 52' so as to be positioned at the left front location, center front location, and right front location, respectively, of the vehicle 52'. The operation of the invention is the same for either sensor mounting location so only one mounting arrangement, i.e., FIG. 1A, is discussed in detail, it being understood that the invention with the other mounting location works similarly. The sensors, 62, 64, 66 (and sensors 72, 74, 76) are accelerometers that each provide an associated electrical signal having electrical characteristics (e.g., frequency, amplitude, etc.) indicative of an impact event between the vehicle and an object such as a pedestrian. In accordance with one example embodiment, the sensors have their axis of sensitivity oriented to be parallel to the front-to-rear axis of the vehicle 52.

Each of the sensors 62, 64, 66 are connected to an electronic control unit ("ECU") 80 for monitoring and processing the accelerometer signals. The ECU 80 may be a microcontroller, a microprocessor, discrete circuitry, and/or an application specific integrated circuit ("ASIC") designed to function in accordance with the present invention. The ECU 80 may be located within the vehicle cabin or other vehicle area and connected to the accelerometers via a communication bus or other wiring arrangement or even wirelessly.

A vehicle speed sensor 82 is also connected to the ECU 80 so as to provide a vehicle speed signal to the ECU 80. The ECU 80 is further connected to an actuatable pedestrian impact mitigation device 84 such as actuators 86, 88 located at the trailing end of the vehicle hood 90 so that, when actuated by the ECU 80, the actuators lift the trailing end of the hood upward thereby allowing the hood to mitigate pedestrian injury during an impact event. The actuators can be actuatable via, for example, pyrotechnics. Other means for actuating the actuators 86, 88 are also contemplated. Also, rather than hood actuators for pedestrian impact mitigation, other actuatable devices could be used such as forward mounted air bags.

Figure 2:
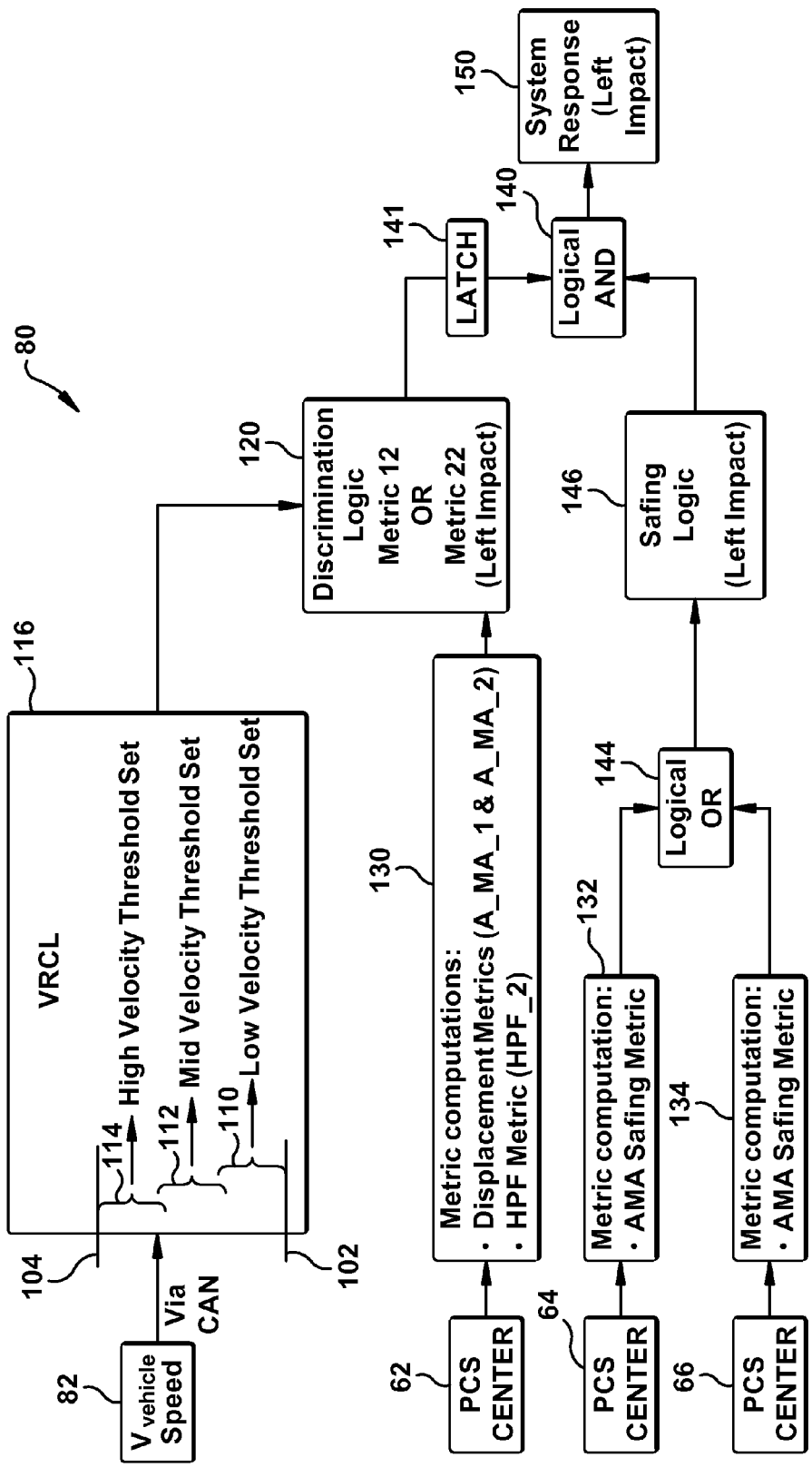
FIG. 2 is a block diagram showing a portion of the control logic used by the electronic control unit of FIG. 1A in accordance with an exemplary embodiment of the present invention.

Referring to FIG. 2, the control logic performed by the ECU 80, in accordance with an example embodiment of the present invention, is shown to determine if there is a pedestrian vehicle impact occurring to the left side of the vehicle 52. The vehicle speed signal from the vehicle speed sensor 82 is monitored by the ECU 80 and one of a plurality of sets of velocity threshold values are selected in response to the monitored vehicle speed value. In accordance with one example embodiment of the present invention, the vehicle speed being between a minimum vehicle speed value 102 and a maximum speed value 104 is classified by velocity range classifier logic ("VRCL") 116 of the ECU 80 as falling within, for example, one of three specific speed ranges. The speed values that define adjacent speed ranges may overlap. Each speed range has associated therewith, a set of threshold values that are used in the control process performed by the ECU 80 for deciding whether to actuate the actuatable impact mitigation devices. If the monitored vehicle speed is less than a minimum vehicle speed 102, for example 20 KPH, or if the monitored vehicle speed is greater than the maximum vehicle speed 104, for example 50 KPH, the ECU 80 will not permit actuation of the actuatable pedestrian impact mitigation device 84. Therefore, it should be appreciated that each of the speed ranges used for possible actuation fall between the minimum 102 and maximum 104 speed values.

As mentioned, the vehicle speed between the minimum vehicle speed 102 and the maximum vehicle speed 104 is classified or determined as falling into one of the predetermined number of discrete speed ranges, e.g., a low-velocity range 110, a mid-velocity range 112, or a high velocity range 114. The mid-velocity range 112 values and the low-velocity range 110 values can have overlapping velocity values, and the mid-velocity range 112 values and the high-velocity range 114 values can have overlapping velocity values. The classification of the monitored vehicle velocity value into one of the velocity ranges by the velocity range classifier logic 116 establishes the threshold value set used in later logic processing described below. If the vehicle speed falls in an overlap velocity range area, threshold sets from each of the velocity ranges are used by the ECU 80 in its discrimination determination process with the results of the determinations being logically OR'ed. The threshold value set(s) selected in response to the velocity range classifier logic 116 is used in a discrimination determination function of the ECU 80.

The ECU 80 determines acceleration metric values for each of the sensors 62, 64, and 66 using metric computation functions 130, 132, 134, respectively. Each accelerometer output signal is monitor and associated displacement values are determined. Specifically, two displacement values are determined from acceleration moving average values occurring over two different time widows. The first determined acceleration moving average value over the first time window is referred to as A_MA_1. The second determined acceleration moving average value over the second time window is referred to as A_MA_2. Displacement values are determined (double integral of acceleration) from each A_MA_1 and A_MA_2 values in a manner described below with regard to FIG. 18. In addition to determining two displacement values for each acceleration signal, an impact energy value is determined from the sensor signal. The determined impact energy is based on the sensor signal within a predetermined frequency range. As will be described in detail below, the discrimination logic 120 compares each of the determined displacement metric value as a function of the impact energy against the threshold sets established by the velocity range classifier logic 116. The output of the discrimination logic 120 is connected to one input of a logic AND function 140 through a latch 141.

In the discrimination logic 120, each of the two determined displacement metric values as a function of impact energy are compared against a threshold set (two threshold sets if the vehicle speed falls within an overlap portion of the speed ranges) selected from the velocity range classifier logic 116 and the resulted comparisons are logically OR'ed. If the vehicle velocity value does fall within overlapped speed ranges, the comparisons of displacement as a function of impact energy against the threshold sets from both speed ranges are logically OR'ed.

In another portion of the control logic shown in FIG. 2, the output signals from each of the other two accelerometer 64 and 66 are processed by associated metric computation functions 132, 134, respectively. The values determined by the metric computation functions 132, 134, such as moving average values of the acceleration signals, are compared against associated fixed thresholds to determine if an impact event above a predetermined value is sensed. The output of the resultant comparisons of the comparisons performed in the metric computation functions 132, 134 are connected to a logic OR function 144. The output of the logic OR function 144 represents a safing function determination for a pedestrian impact event. The result or output of the safing determination 146 is connected to the second input of the logical AND function 140. The output of the logic AND function 140 represents a system response for left impacts 150

FIG. 2 shows the left impact sensing control logic. Similar control logic is present within the ECU 80 for center impact sensing and right impact sensing. In the center impact sensing logic, the ECU 80 uses the center sensor signal as a discrimination signal and the right and left sensor signals as safing signals. In the right impact sensing logic, the ECU 80 uses the right sensor signal as a discrimination signal and the left and center sensor signals as safing signals.

Figure 3:
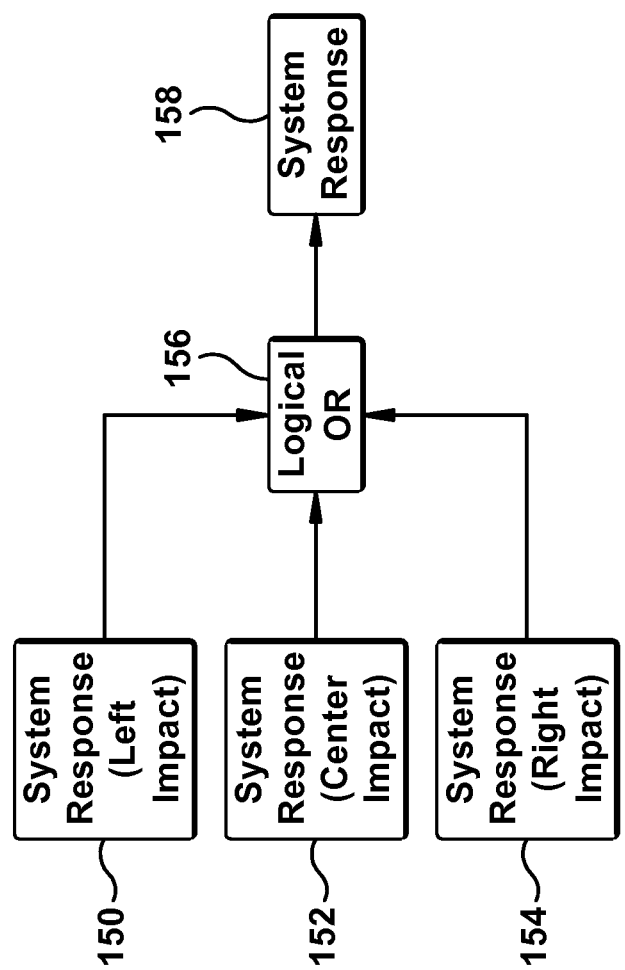
FIG. 3 is a block diagram showing a portion of the control logic used by the electronic control unit of FIG. 1A in accordance with an exemplary embodiment of the present invention.

Referring to FIG. 3, the system response for center impact is shown as 152 and the system response for right impact is shown as 154. Each of the system response determinations for left 150, center 152, and right 154 are connected to a logic OR function 156 of the ECU 80. The output of the logical OR function 156 represents the final system response 158 that results in the ECU controlling the actuatable pedestrian impact mitigation device 84. If the system response 158 is TRUE or HIGH, meaning that a pedestrian impact has been determined, the actuatable pedestrian impact migration device 84 is actuated.

Figure 4:
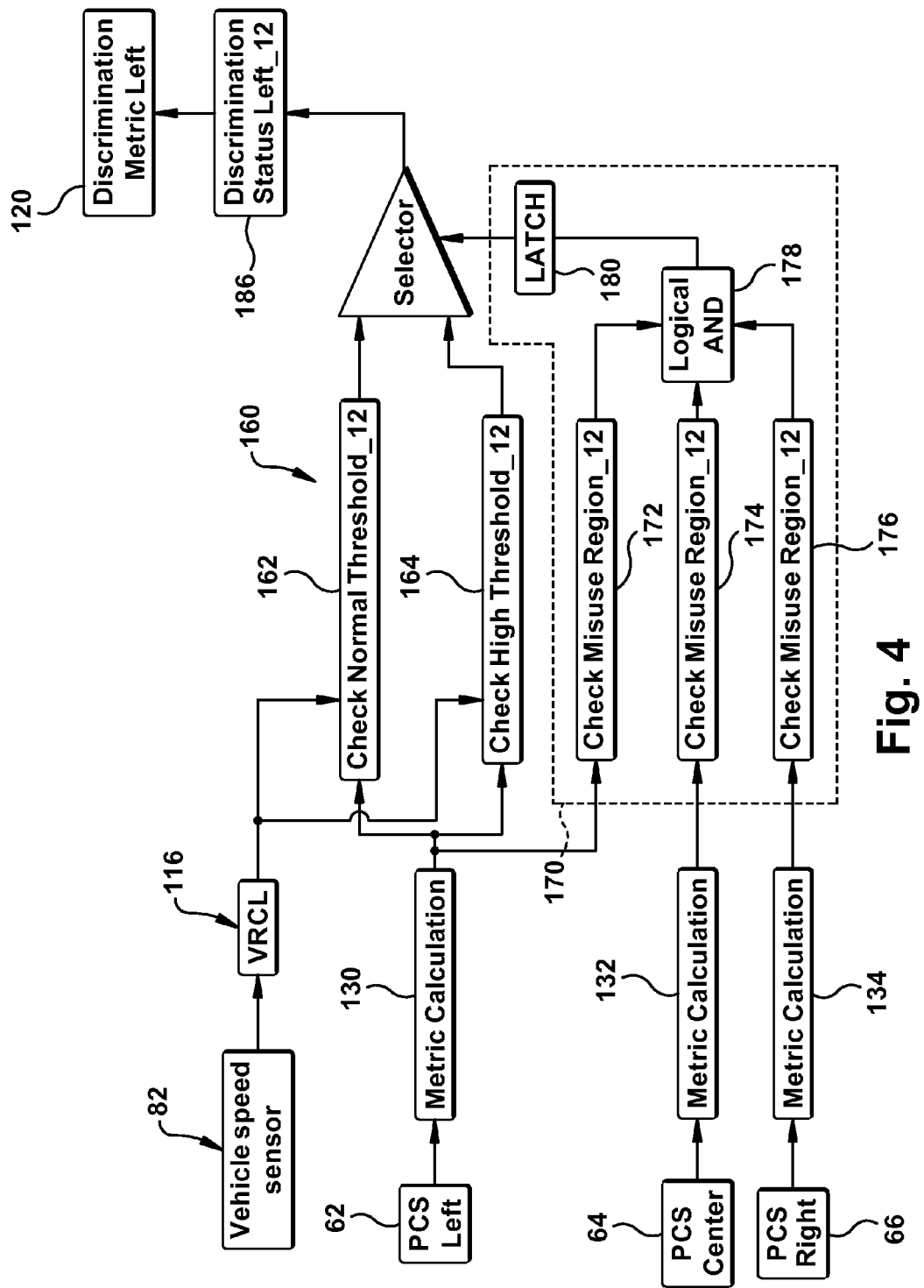
FIGS. 4 and 5 are block diagrams showing portions of the discrimination control logic followed by the electronic control unit of FIG. 1A in accordance with an exemplary embodiment of the present invention.

Referring to FIG. 4, the discrimination determination logic for a left impact sensor using the determined displacement value based on one of the acceleration time windows, i.e., A_MA_1, as a function of impact energy determined from that sensor is shown. The displacement calculated value from metric computation function 130 as a function of impact energy is compared against a threshold set 160. The selection of the threshold set 160 is controlled by the velocity range classifier logic 116. Each threshold set 160 includes a normal threshold value and a high threshold value. The high threshold value is a threshold value that is greater than the normal threshold value. The normal and high threshold values can either be fixed values or can be variable values. For the purpose of explanation, each the normal and high threshold values are described as being fixed values. Again, the threshold value set selected in the discrimination determination shown in FIG. 4 is selected in response to the vehicle velocity value falling within a particular speed range as determined by the velocity range classifier logic 116. If the speed falls within an overlap portion of the ranges, comparisons with two sets of normal and high thresholds will be performed with the results logically OR'ed.

Assuming that the vehicle speed falls within a speed range that is not overlapped by another speed range, only one of the comparisons of the displacement as a function of impact energy is used in the discrimination determination. Whether the normal or high threshold is used is responsive to a misuse determination using misuse determining logic 170. A misuse condition is defined as a predetermined range of sensed displacement as a function of impact energy values that could occur for non-pedestrian impacts such as a rock hitting the front of the vehicle, etc. Under such misuse impact event, it would not be desirable to actuate the actuatable pedestrian impact mitigation device 84.

Figure 6:
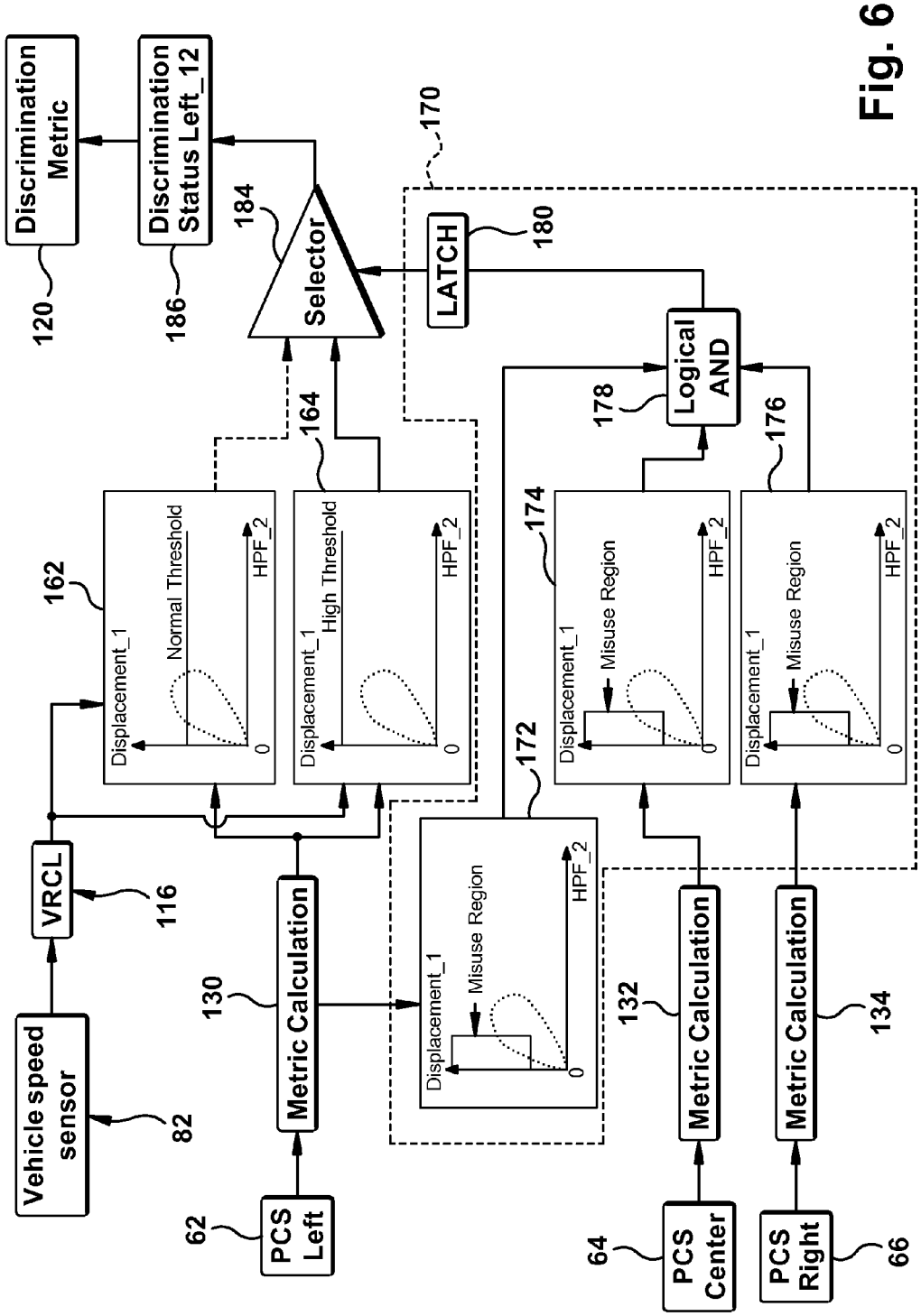

Referring to FIGS. 4 and 6, the misuse determining logic 170 processes the output signals from each of the sensors 62, 64, 66 to determine if each of the sensors indicate that a misuse event has occurred. Specifically, the metric values from the left sensor 62 are compared against misuse values in misuse logic 172. The metric values from the center sensor 64 are compared against misuse values in misuse logic 174. The metric values from the right sensor 66 are compared against misuse values in misuse logic 176. The misuse event boxes are seen in FIG. 6. If the associated sensor signal falls within a misuse box, the output of the logic 172, 174, 176 will be TRUE or HIGH. The outputs from the misuse determination functions 172, 174, and 176 are logically AND'ed at 178 by the ECU 80. The output of the AND function 178 is latched by a time latch 180. The output of the latch 180 is used to control a selector function 184.

The selector function 184 will either select the normal threshold determination 162 or the high threshold determination 164 in response to the output of the latch 180, which is, in turn, responsive to whether a misuse event has occurred. If a misuse event has occurred, the output of latch 180 will be TRUE or HIGH and the resultant comparison using the high threshold 164 is output to the discrimination status condition 186. If no misuse event has occurred, the output of the latch 180 will be FALSE or LOW, and the resultant comparison using the normal threshold 162 is output to the discrimination status 186. The discrimination status left 186 is used by the discrimination logic 120.

Figure 5:
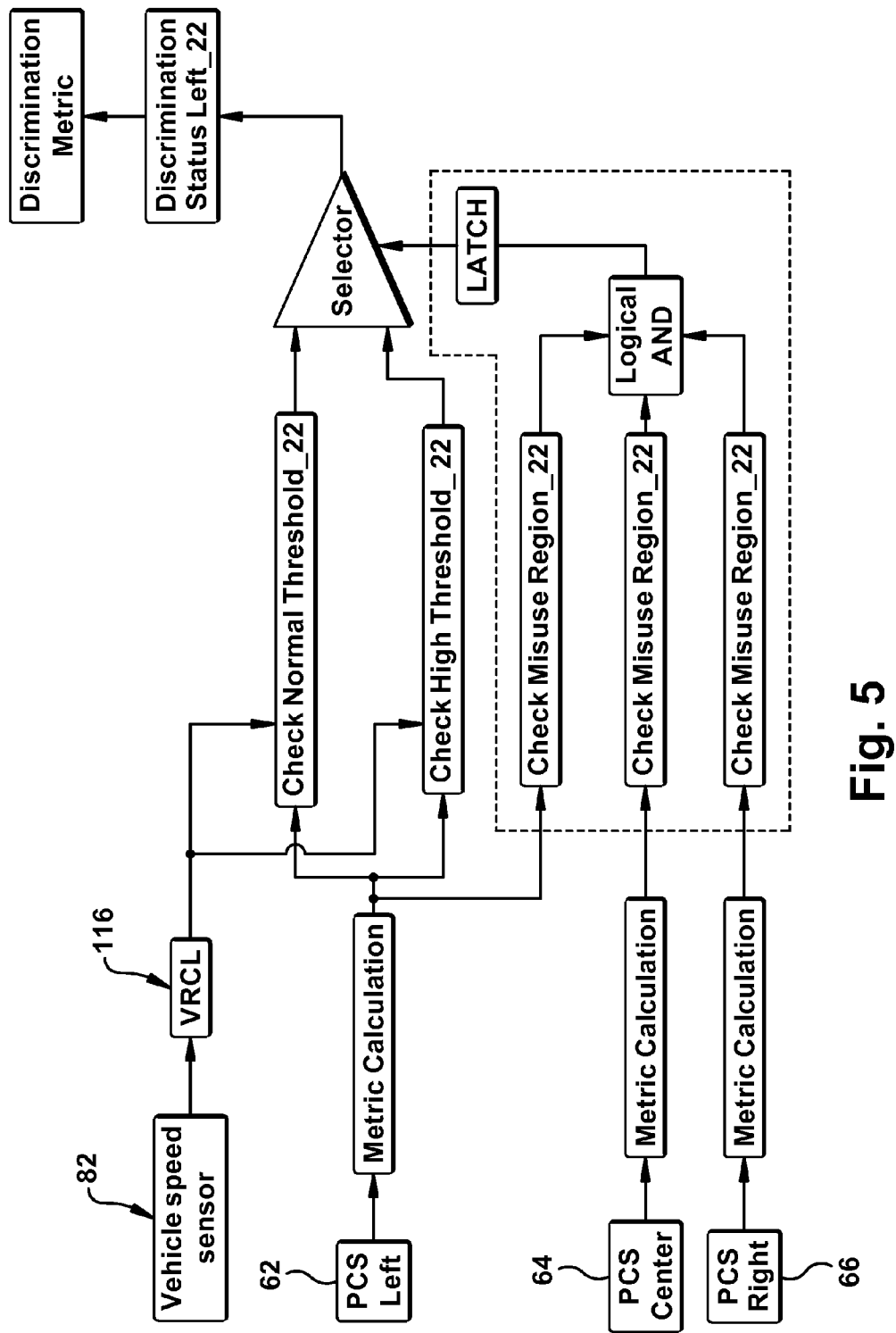

Referring to FIG. 5, the control logic, similar to that shown in FIG. 4 for the A_MA_1 left impact determination, is shown for the left sensor impact determination using the A_MA_2 time window for displacement determination.

One should appreciate that overall control logic duplicates the control logic shown in FIGS. 4 and 5 for each of the sensors 62, 64, and 66. Also, the duplicated control logic shown in FIGS. 4 and 5 are incorporated into the control logic shown in FIG. 2 and that the control logic shown in FIG. 2 is duplicated for the other sensors to end up with the final control arrangement shown in FIG. 3 that produces a final system response to actuate or not actuate the actuatable pedestrian impact mitigation device 84.

Figure 18:
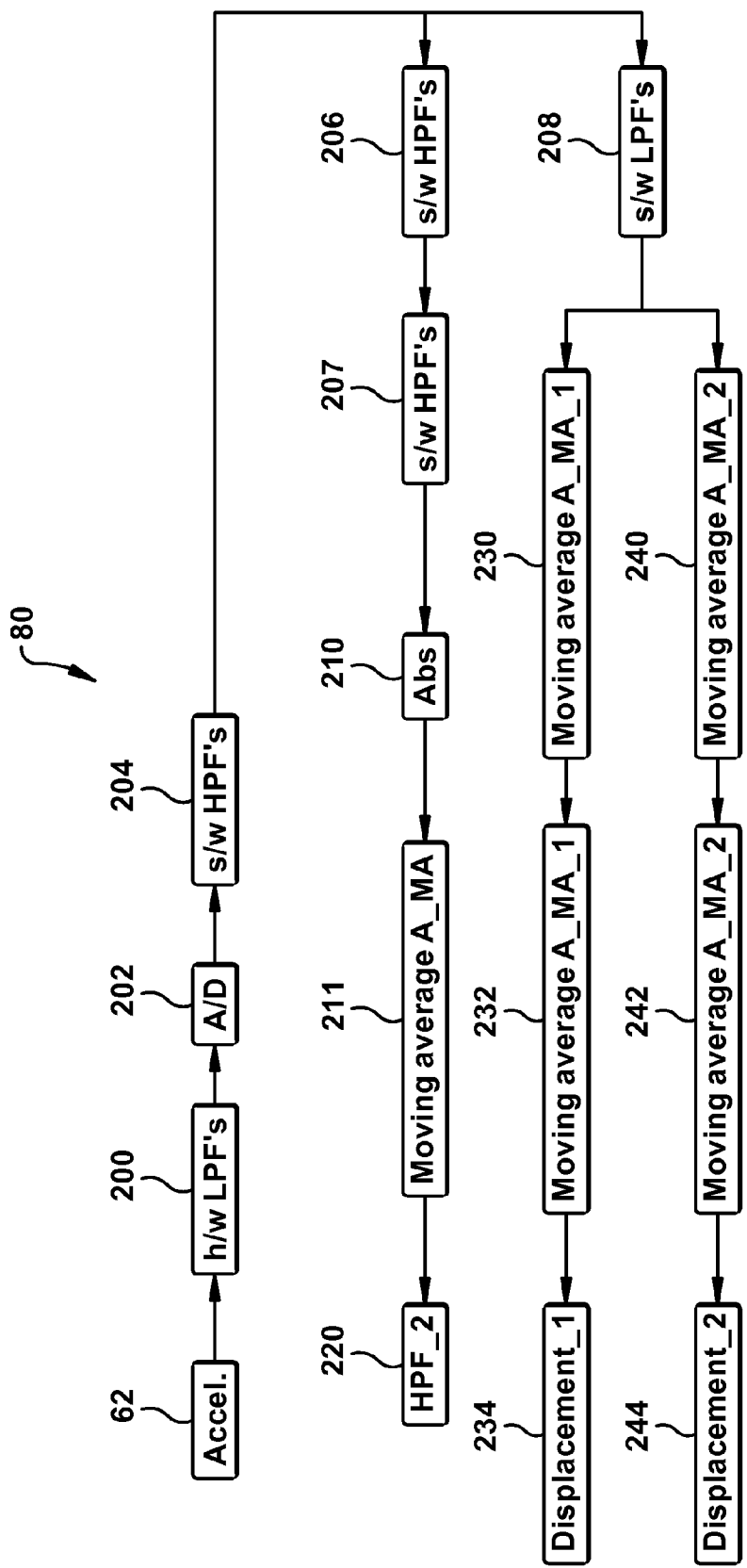
FIG. 18 is a block diagram showing a portion of the control logic of the electronic control unit for determining metric values in accordance with an exemplary embodiment of the present invention.

Referring to FIG. 18, the determination metric calculations will be appreciated. Each of the sensors 62, 64, 68 are accelerometers that output an electrical signal having electrical characteristics such as frequency and amplitude indicative of the impact. Each sensor has its own associated metric calculation to determine displacement values over two different time windows and the impact energy value based on impact energy over a particular frequency range. The controller 80 performs each of these metric calculations. By way of example, the processing for accelerometer 62 is shown to determine displacement values and impact energy, it being understood that the processing for the other accelerometers 64, 66 is the same. The output signal from the accelerometer 62 is low-pass filtered using, for example, a hardware filter 200 to permit further process (anti-alias filter). The low-pass filter passes a first frequency band, e.g., frequencies from 0-800 Hz. The filtered signal is converted to a digital signal using an analog-to-digital converter 202 for further processing by the ECU 80. The ECU 80 then high-pass filters 204 the signal so as to remove any sensor bias (DC drift). The high-passed signal is then further high-pass filtered 206 to eliminate frequencies from DC-400 Hz. The output of HPF 206 will then contain frequency values between 400-800 Hz. The HPF 206 also eliminates rough road events from further processing. A second high-pass filter 207 is cascaded with the first high-pass filter 206 to form a second order filter to obtain a sharper cutoff. The absolute value 210 of the high-pass filtered 206 signal is determined. The absolute value of the filter acceleration signal is indicative of the impact energy as sensed by left sensor 62. A moving average A_MA of the absolute value of the signal is determined 211 for smoothing purposes. The resultant signal is a high-pass filter signal 220, designated HPF_2, and is indicative of impact energy within a particular frequency range (e.g., 400-800 Hz) of interest. This HPF_2 impact energy value is useful in determining the occurrence of a pedestrian impact.

The output of the filter 204 is also used to determine displacement values (double integral of acceleration) over two different time windows. Specifically, the output of the HPF 204 is low-passed filtered by a low-pass filter 208 so as to pass signals with a frequency between DC and 220 Hz, for example. The output of the LPF 208 is processed by a first moving average calculation 230 (first integral) followed by a second moving average calculation 232 (second integral) to arrive at a first displacement value 234 which is designated Displacement_1. The output of the LPF 208 is also processed by a moving average calculation 240 (first integral) followed by a moving average calculation 242 (second integral) to arrive at a second displacement value 244 which is designated Displacement_2. The time windows for the moving average calculations for Displacement_1 and Displacement_2 are different.

Again, it should be appreciated that the two displacement values and impact energy value are determined for each of the sensors 62, 64, 66. The electronic control unit 80 determines if a pedestrian impact event is occurring by comparing the determined displacement values as a function of the determined impact energy against threshold value sets. The selection of threshold value set comparison results are controlled in response to the determination of the occurrence of a misuse condition as is explained below. It should be appreciated that the threshold sets used are based upon vehicle speed (determines which high and normal threshold sets are used) and upon the determination of a misuse condition (use the high or the normal threshold).

FIG. 6, by way of example, shows the occurrence of a dynamic misuse condition based on metric 12 (displacement_1 as a function of impact energy HPF_2) which would mean that the HIGH threshold determination 164 would be selected. Since the determined displacement as a function of impact energy based on the left side accelerometer does not cross the HIGH threshold, the actuatable pedestrian impact mitigating device 84 would not be actuated because of the impact sensed from that portion of the overall control logic. In effect, the system response 150 would be a FALSE or LOW. However, that system response 150 is OR'ed with the system responses 152, 154 for a final actuation determination. Also, the discrimination determination shown in FIGS. 4 and 6 are based on the displacement A_MA_1 time window calculation. The final discrimination determination 120 is the result of OR'ing the A_MA_1 displacement determinations as a function of impact energy against thresholds with the A_MA_2 displacement determinations as a function of impact energy analysis.

Figure 7:
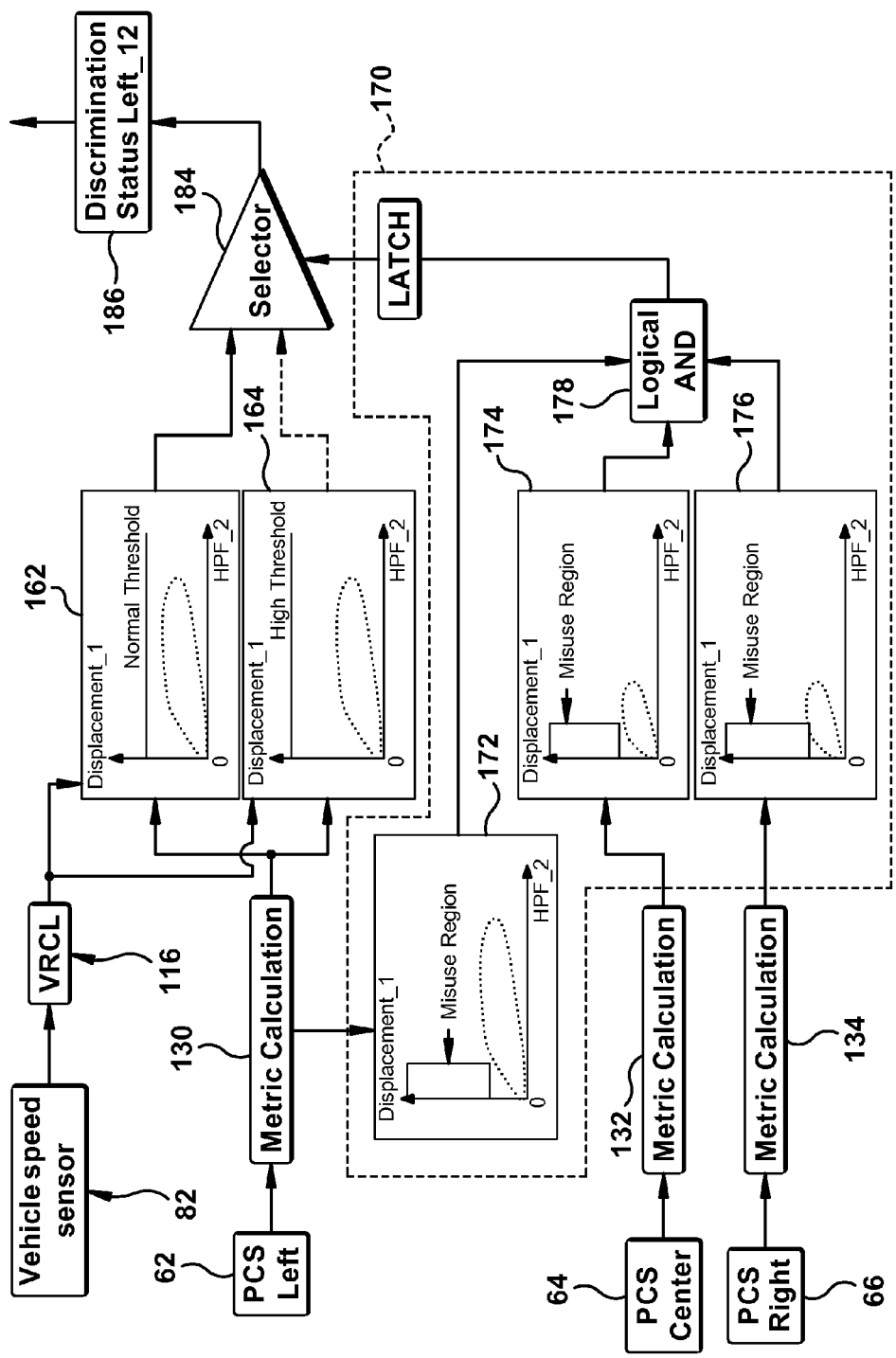

Referring to FIG. 7, a static misuse impact event is shown as analyzed by a portion of the control logic based on the A_MA_1 signal using the discrimination metric 12 logic (displacement_1 as a function of impact energy HPF_2) of the discrimination logic 120 from the left sensor. Note than no misuse box is entered so the normal threshold 162 determination is selected. Since the normal threshold is not crossed in the displacement vs. impact energy determination, no activation would occur as a result of this analysis.

Figure 8:
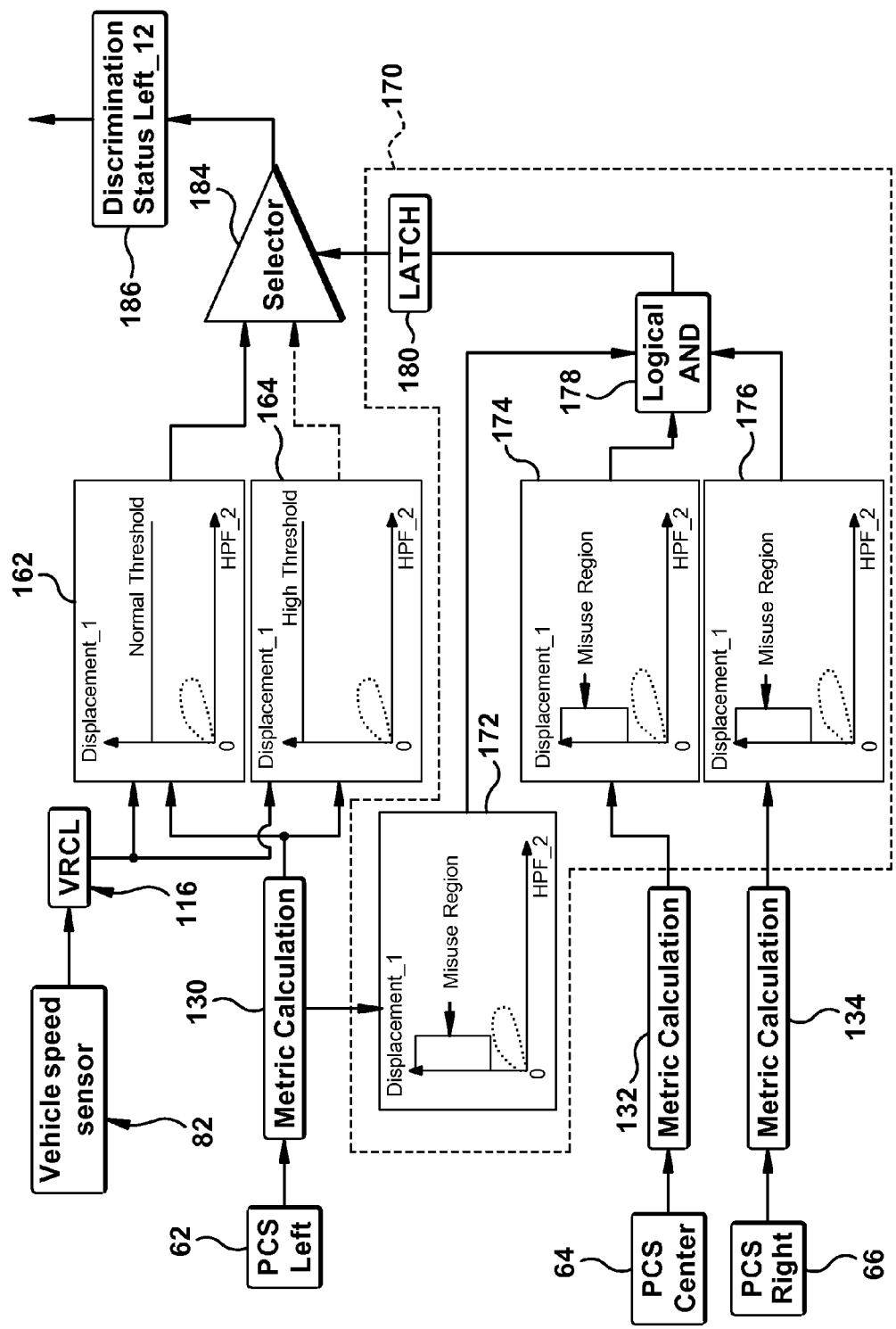

Referring to FIG. 8, a no fire pedestrian impact event is shown as analyzed by a portion of the control logic based on the A_MA_1 signal using the discrimination metric 12 (displacement_1 as a function of impact energy HPF_2) of the discrimination logic 120 from the left sensor. Note than no misuse box is entered so the normal threshold 162 determination is selected. Since the normal threshold is not crossed, no activation would occur as a result of this analysis.

Figure 9:
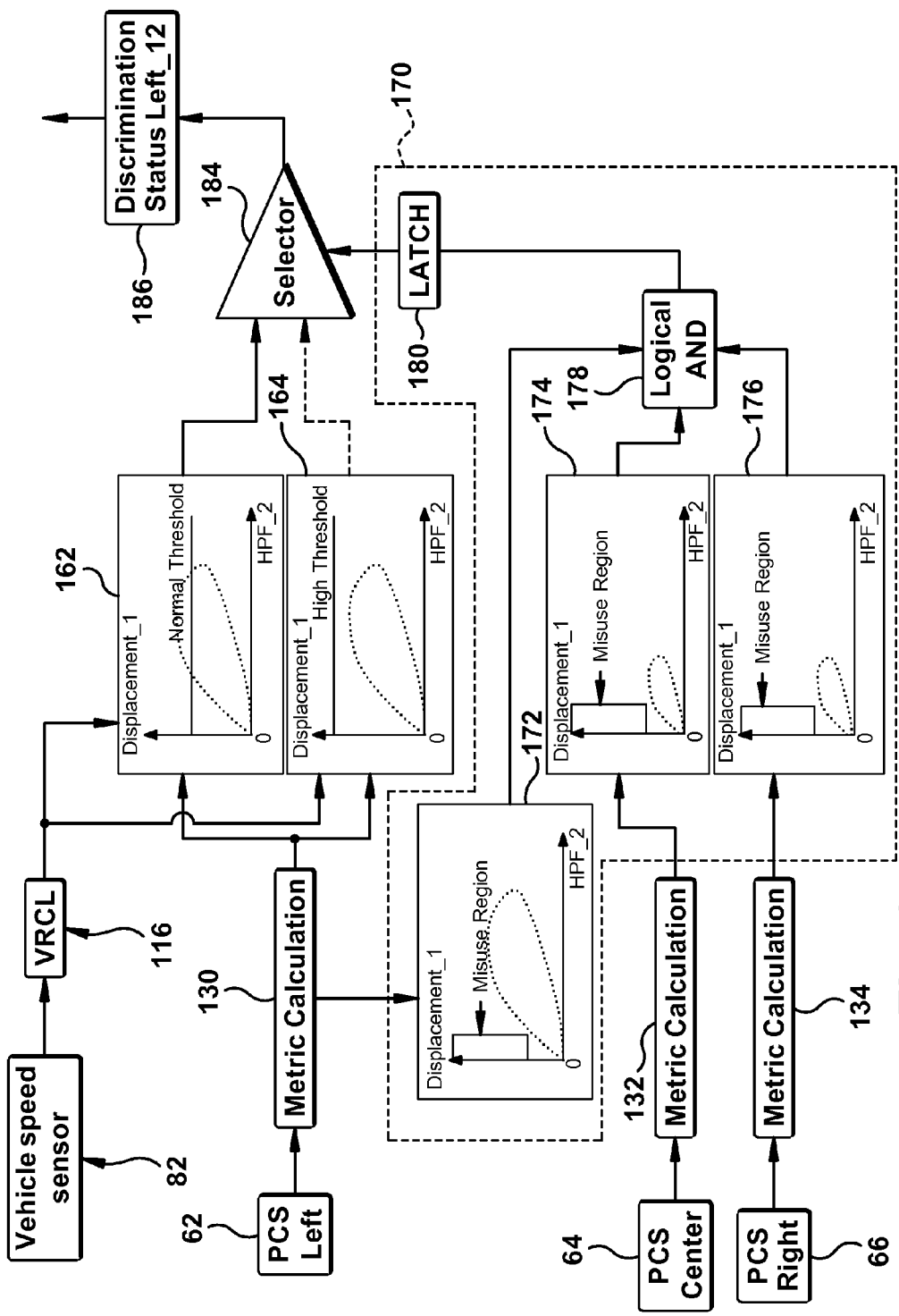

Referring to FIG. 9, a must fire pedestrian impact event is shown as analyzed by a portion of the control logic based on the A_MA_1 signal using the discrimination metric 12 logic (displacement_1 as a function of impact energy HPF_2) of the discrimination logic 120 from the left sensor. Note than no misuse box is entered so the normal threshold 162 determination is selected. Since the normal threshold is crossed, activation of the actuatable impact mitigation device 84 would occur as a result of this analysis assuming the safing determinations are true.

Figure 10:
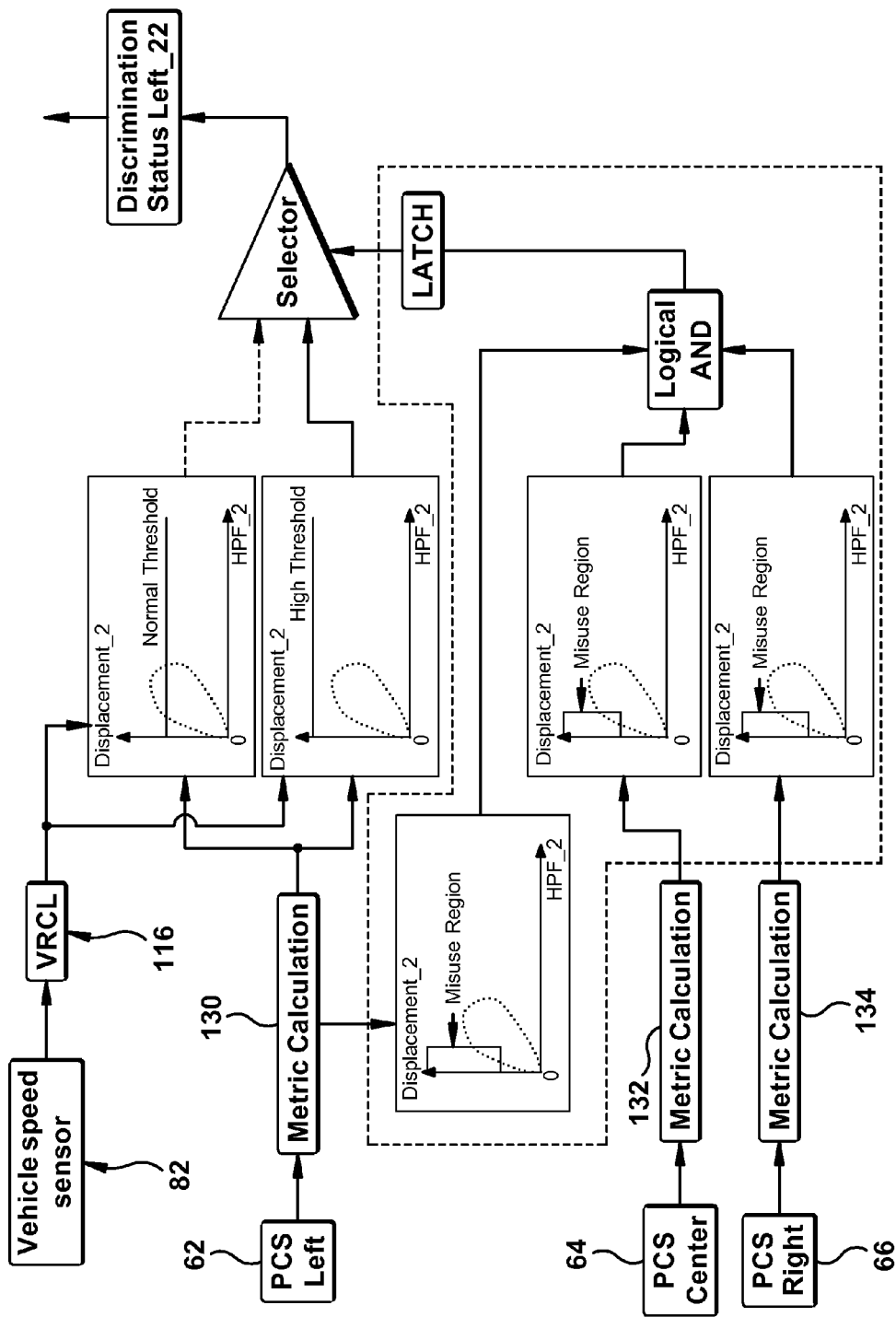

Referring to FIG. 10, a dynamic misuse impact event is shown as analyzed by a portion of the control logic based on the A_MA_2 signal using the discrimination metric 22 (displacement_2 as a function of impact energy HPF_2) of the discrimination logic 120 from the left sensor. Note that the misuse boxes are entered so that the logic selects the high threshold for discrimination. Since the high threshold is not crossed, no activation would occur as a result of this analysis.

Figure 11:
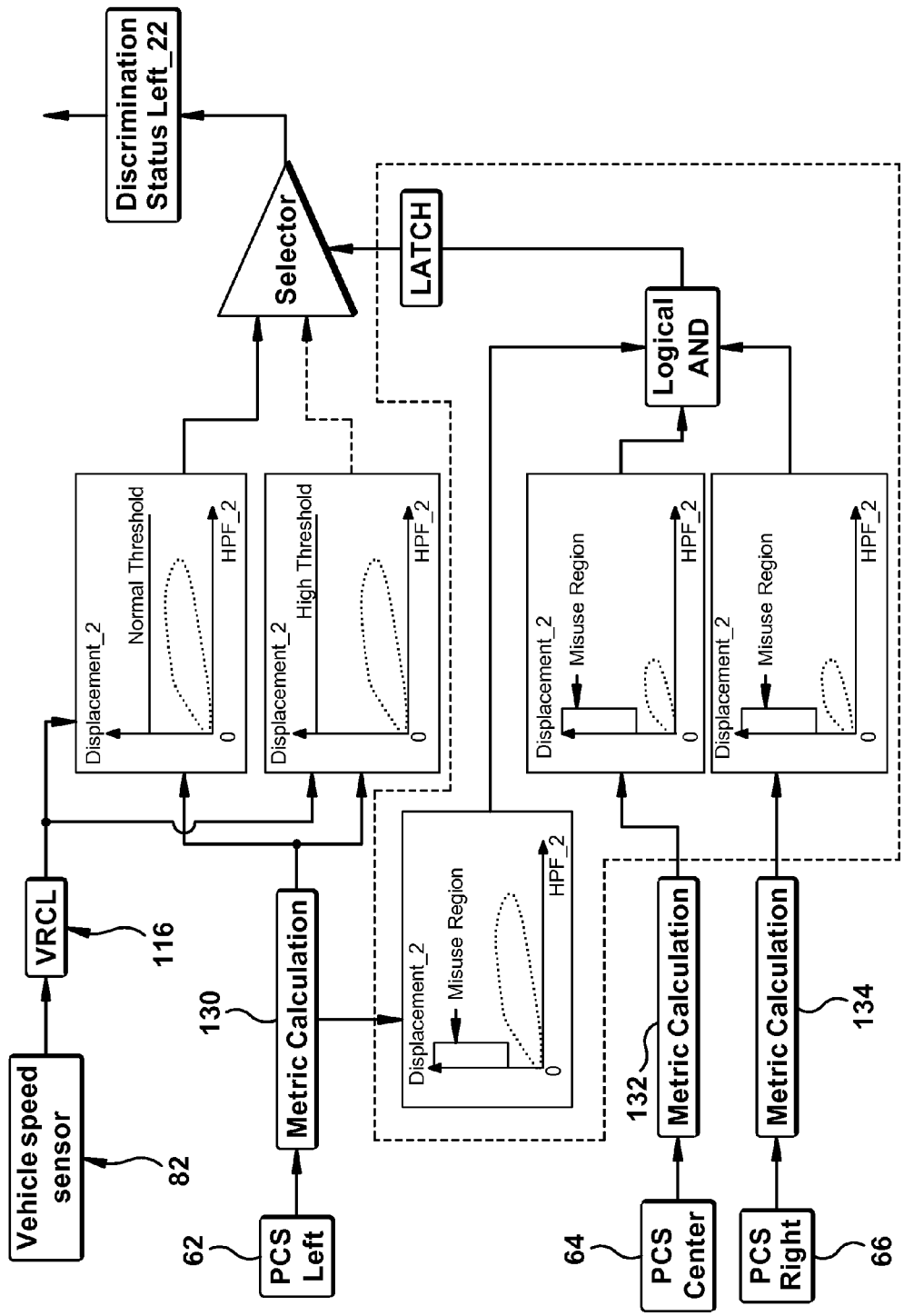

Referring to FIG. 11, a static misuse impact event is shown as analyzed by a portion of the control logic based on the A_MA_2 signal using the discrimination metric 22 logic (displacement_2 as a function of impact energy HPF_2) of the discrimination logic 120 from the left sensor. Note than no misuse box is entered so the normal threshold determination is selected. Since the normal threshold is not crossed, no activation would occur as a result of this analysis.

Figure 12:
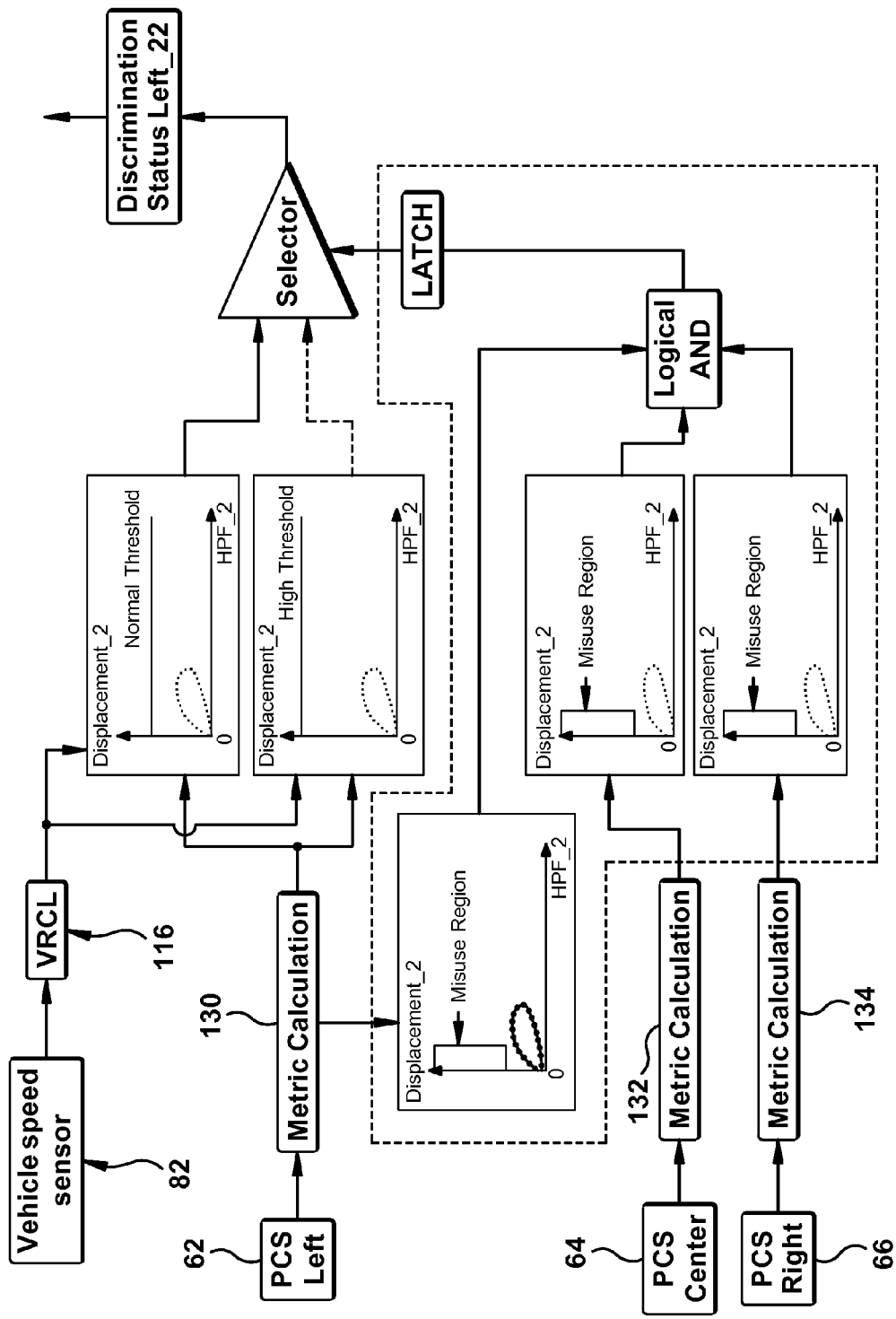

Referring to FIG. 12, a no fire pedestrian impact event is shown as analyzed by a portion of the control logic based on the A_MA_2 signal using the discrimination metric 22 logic (displacement_2 as a function of impact energy HPF_2) of the discrimination logic 120 from the left sensor. Note than no misuse box is entered so the normal threshold determination is selected. Since the normal threshold is not crossed, no activation would occur as a result of this analysis.

Figure 13:
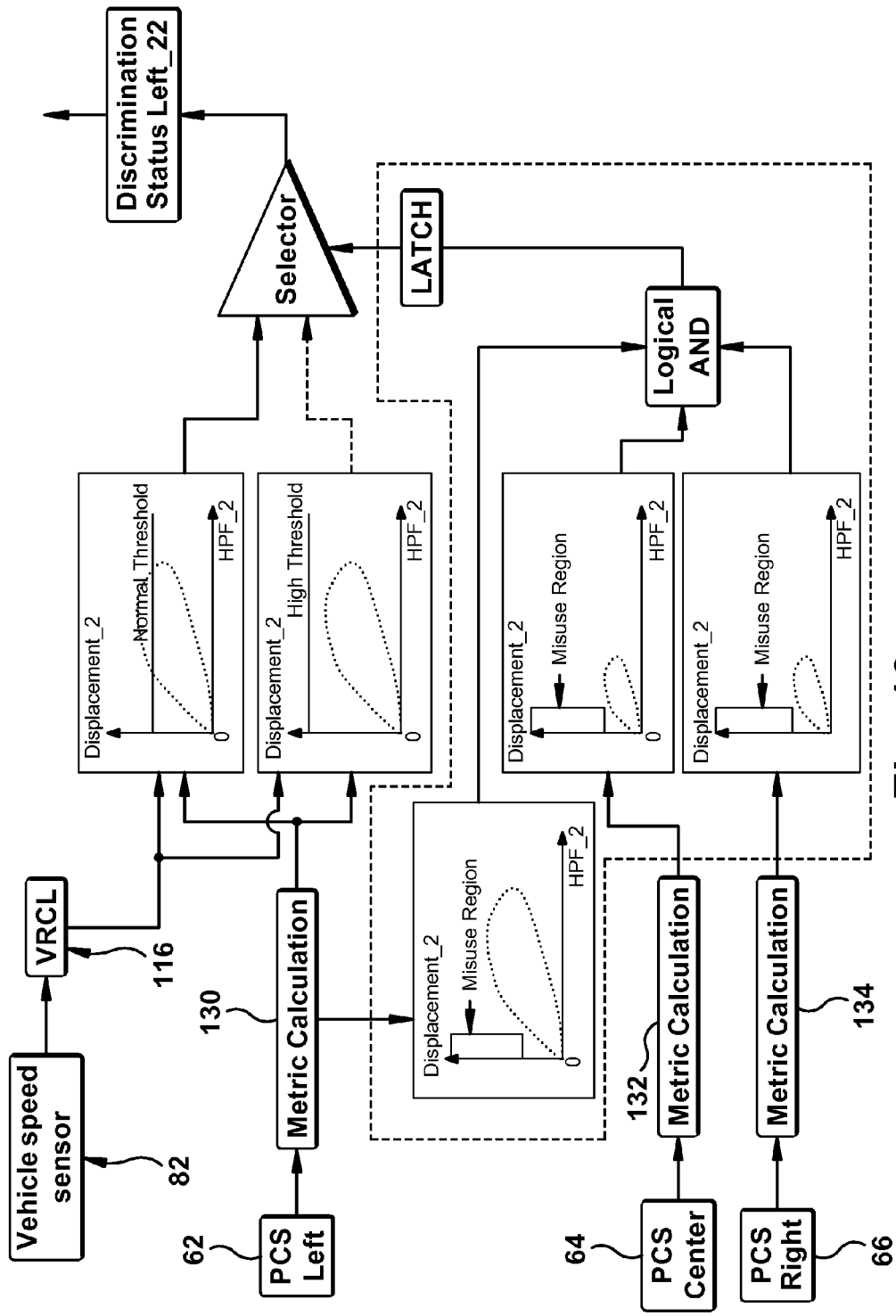

Referring to FIG. 13, a must fire pedestrian impact event is shown as analyzed by a portion of the control logic based on the A_MA_2 signal using the discrimination metric 22 logic (displacement_2 as a function of impact energy HPF_2) of the discrimination logic 120 from the left sensor. Note than no misuse box is entered so the normal threshold 162 determination is selected. Since the normal threshold is crossed, activation of the actuatable impact mitigation device 84 would occur as a result of this analysis assuming the safing determinations are true.

Figure 14:
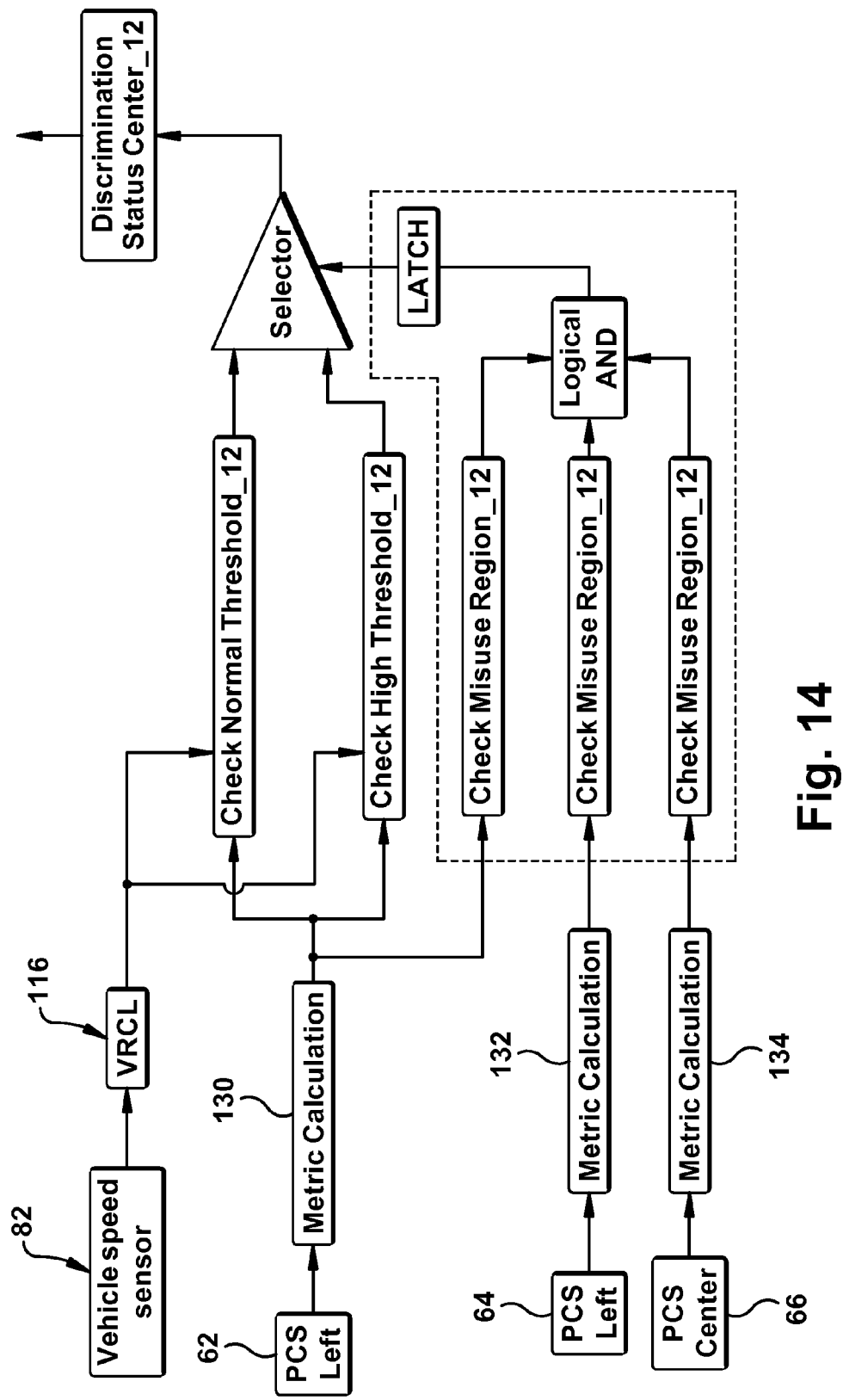
FIGS. 14-17 are block diagrams showing portions of the discrimination control logic followed by the electronic control unit of FIG. 1A in accordance with an exemplary embodiment of the present invention.
Figure 15:
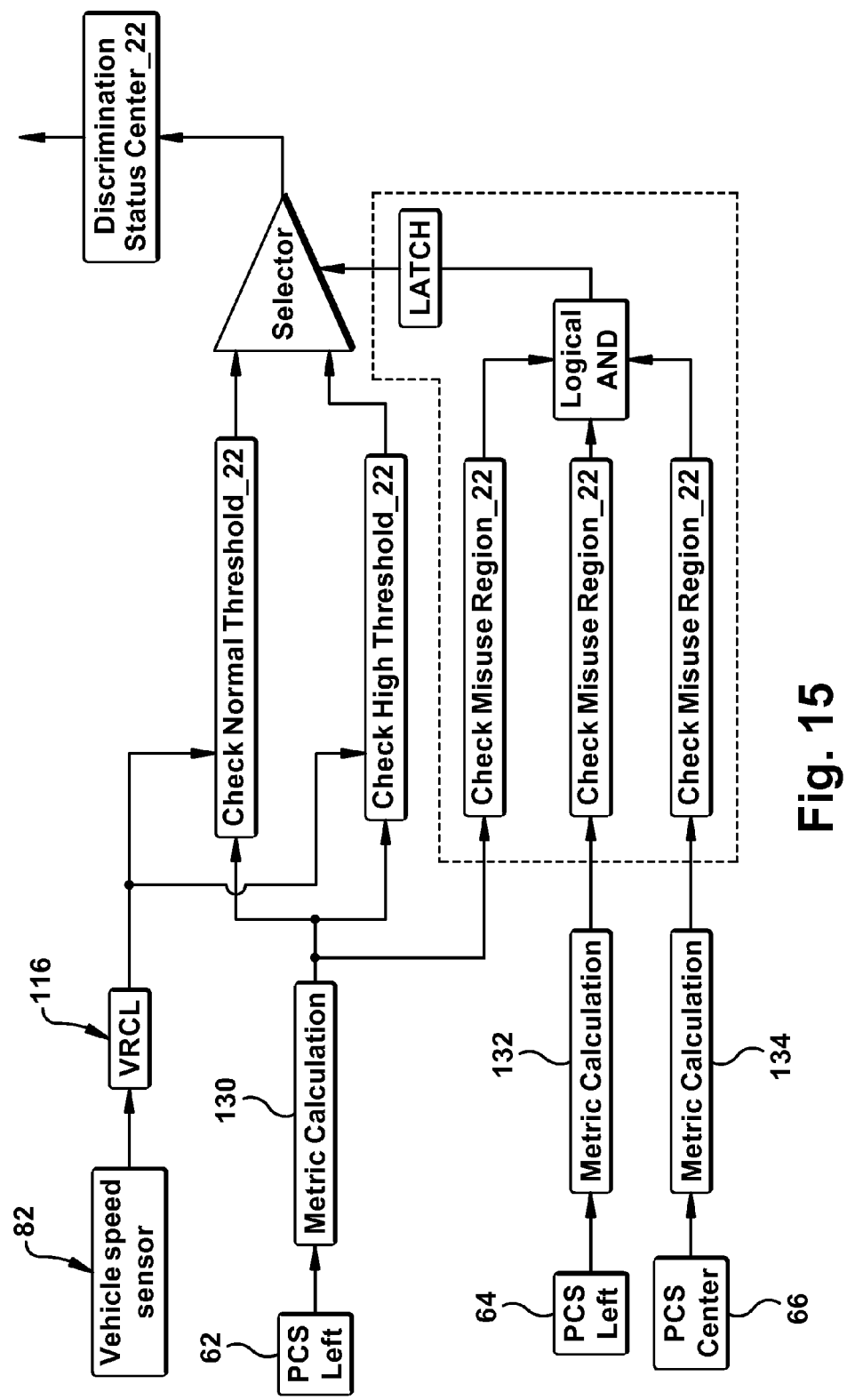
Figure 16:
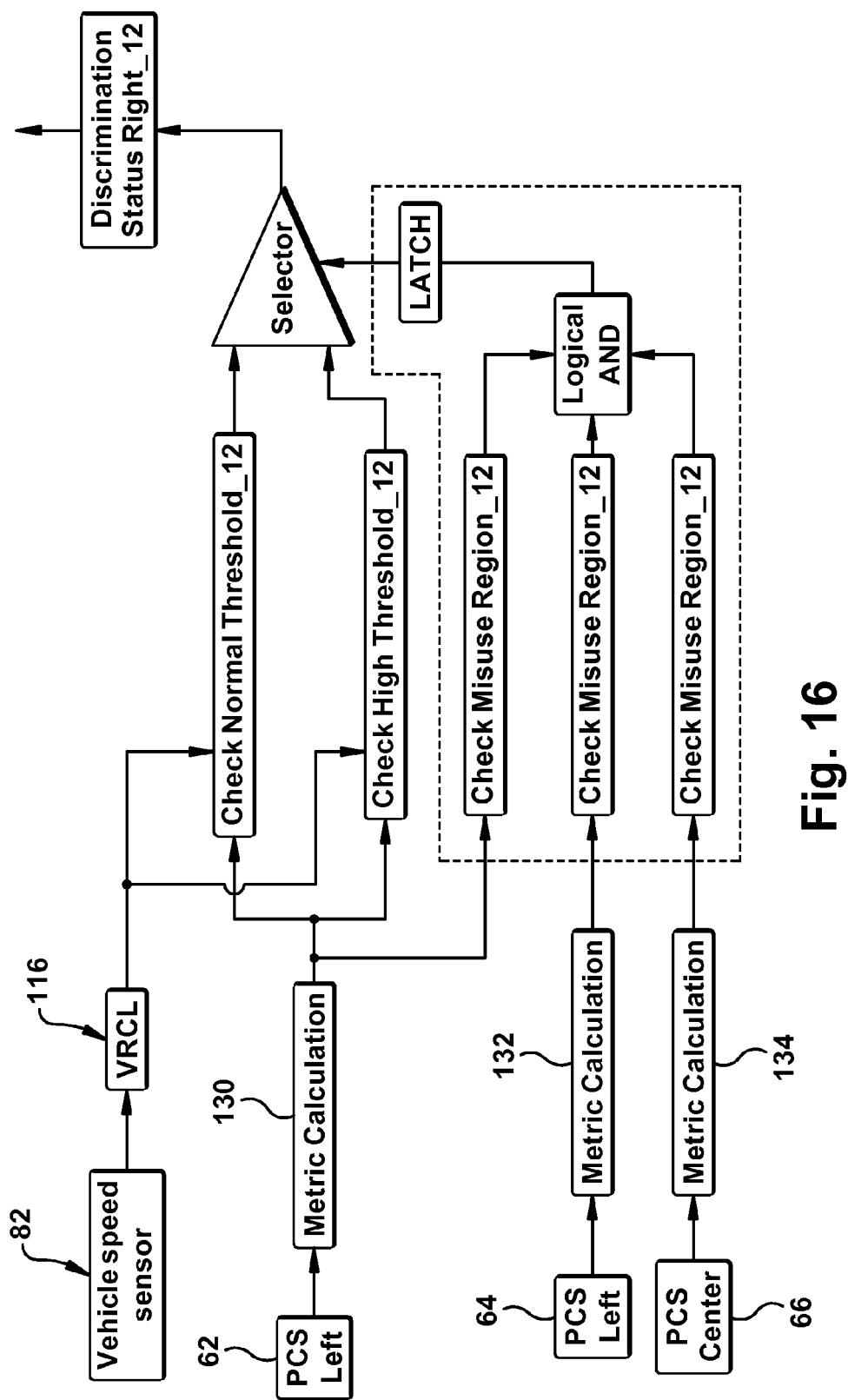
Figure 17:
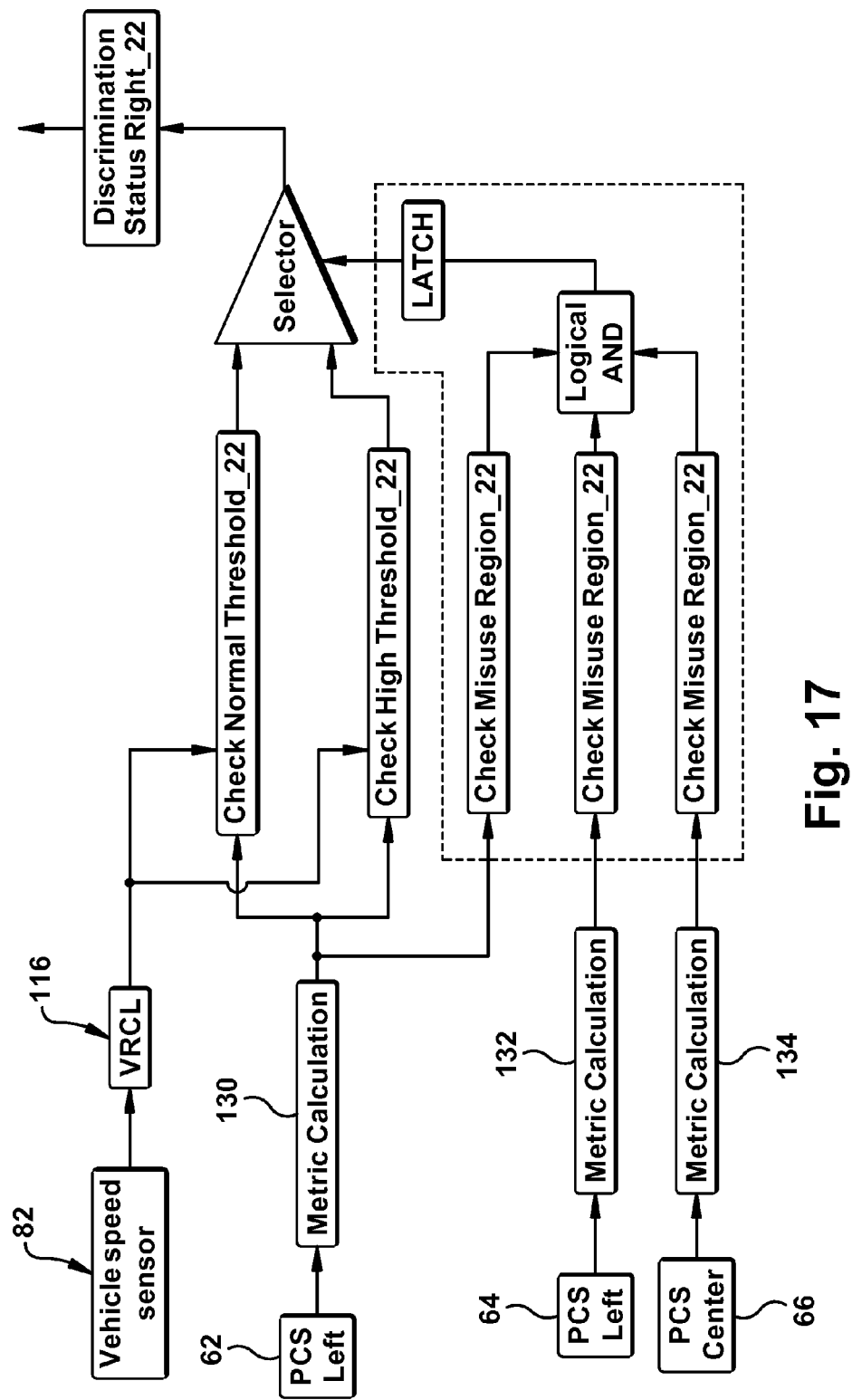

As mentioned, the discrimination logic shown and described in detail in FIGS. 4, 5, and 6 for the left sensor analysis is duplicated for the center sensor 64 and right sensor 66. FIGS. 14 and 15 show the discrimination logic for the center sensor 64. FIGS. 16 and 17 show the discrimination logic for the right sensor 66.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for detecting a pedestrian/vehicle impact comprising:
   a plurality of sensors mounted near a forward location of a vehicle, each sensor providing an associated signal indicative of an impact event;
   a metric determining device for determining metric values for each of the sensor signals;
   a controller for determining if any of said determined metric values indicates the occurrence of a misuse event, said controller further determining the occurrence of a pedestrian/vehicle impact event by comparing the metric value of at least one sensor signal against a selectable threshold and providing an actuation signal in response to said comparison, the selectable threshold being selected in response to the determined occurrence of a misuse event; and
   an actuatable impact mitigation device attached to the vehicle and being responsive to said actuation signal from said controller.

2. The apparatus for detecting a pedestrian/vehicle impact of claim 1 further including a vehicle speed sensor for providing a vehicle speed signal, said controller determining the occurrence of a pedestrian/vehicle impact in further response to said vehicle speed signal.

3. The apparatus for detecting a pedestrian/vehicle impact of claim 2 wherein said controller provides said actuation signal when said vehicle speed is greater than a first predetermined speed and less than a second predetermined speed.

4. The apparatus for detecting a pedestrian/vehicle impact of claim 1 wherein said plurality of sensors are accelerometers.

5. The apparatus for detecting a pedestrian/vehicle impact of claim 4 wherein said metric determining device determines crash displacement values for each of said sensors from said sensor signals, said controller providing said actuation signal in response to said determined displacement values.

6. The apparatus for detecting a pedestrian/vehicle impact of claim 5 wherein said metric determining device determines frequency content of each of said sensor signals, said controller providing said actuation signal in response to said determined displacement values as a function of the determined frequency content.

7. The apparatus for detecting a pedestrian/vehicle impact of claim 6 wherein said misuse impact event is defined by a range of determined displacement values as a function of a range of frequency values, a determination of a impact event falling with both of the misuse ranges by the controller preventing provision of said actuation signal for a predetermined time period.

8. A method for detecting a pedestrian/vehicle impact comprising the steps of:
   sensing impact acceleration at a plurality of locations near the front of the vehicle;
   determining metric values for each of the sensed accelerations;
   determining if any of the metric values indicates the occurrence of a misuse impact event;
   selecting a threshold in response to the determination of the occurrence of a misuse impact event;
   comparing the metric value of at least one sensed acceleration against the selectable threshold; and
   providing an actuation signal to an impact mitigation device in response to said comparison.

9. The method of claim 8 further including the steps of sensing vehicle speed, said step of providing the actuation signal being further in response to the sensed vehicle speed.

10. The method of claim 9 wherein the step of providing the actuation signal includes being responsive to the sensed vehicle speed being greater than a first predetermined speed and less than a second predetermined speed.

11. The method of claim 8 wherein the step of determining metric values includes the steps of determining crash displacement values for each of said sensors from said sensor signals, said step of providing said actuation signal being response to said determined displacement values.

12. The method of claim 11 wherein the step of determining metric values includes determining a high passed filtered acceleration value and wherein the step of providing the actuation signal includes being response to said determined displacement values as a function of the high passed filtered acceleration value.

13. The apparatus for detecting a pedestrian/vehicle impact of claim 1 wherein said metric determining device determines displacement values and impact energy values for each of said sensors from said sensor signals, said controller determining the occurrence of a pedestrian/vehicle impact event by comparing a range of displacement values as a function of impact energy values.

* * * * *